United States Patent [19]

Simoni

[11] Patent Number: 4,772,387
[45] Date of Patent: Sep. 20, 1988

[54] DEVICE FOR CONDITIONING WATER CONTAINING CALCIUM CARBONATE AND INSTALLATION CONSTRUCTED WITH THIS DEVICE

[75] Inventor: Jean-Yves Simoni, La Chaux-de-Fonds, Switzerland

[73] Assignee: Gilbert Sonnay, Switzerland

[21] Appl. No.: 918,625

[22] PCT Filed: Feb. 12, 1986

[86] PCT No.: PCT/CH86/00017
§ 371 Date: Oct. 14, 1986
§ 102(e) Date: Oct. 14, 1986

[87] PCT Pub. No.: WO86/04887
PCT Pub. Date: Aug. 28, 1986

[30] Foreign Application Priority Data

Feb. 14, 1985 [FR] France .................. 85 02282
Apr. 17, 1985 [FR] France .................. 85 05919
Apr. 17, 1985 [FR] France .................. 85 05920

[51] Int. Cl.$^4$ .............................................. C02F 1/48
[52] U.S. Cl. ..................................... 210/132; 137/118; 210/222; 210/254
[58] Field of Search ............... 210/97, 101, 130, 132, 210/222, 223, 335, 252, 254, 695; 137/117, 118, 906

[56] References Cited

U.S. PATENT DOCUMENTS 3,088,481  5/1963  Brueckner et al. ............. 137/117
3,680,705  8/1972  Happ et al. .................... 210/222
3,714,953  2/1973  Solvang ....................... 137/906 X
3,804,257  4/1974  Sommermeyer .................. 210/335
3,923,660 12/1975  Kottmeier ..................... 210/222

FOREIGN PATENT DOCUMENTS 0057500  8/1982  European Pat. Off. .
0119368  9/1984  European Pat. Off. ............ 210/222
3018854 11/1981  Fed. Rep. of Germany .
3333551  3/1984  Fed. Rep. of Germany .

Primary Examiner—Richard V. Fisher
Assistant Examiner—W. Gary Jones
Attorney, Agent, or Firm—Ostrolenk, Faber, Gerb & Soffen

[57] ABSTRACT

The present invention relates to a device for conditioning water containing calcite and an installation constructed with this device. This device essentially comprises an inner tubular element (10), an outer tubular element (11) and two end tips (12 and 13). These elements are arranged so as to provide an annular space (18) between the tubular element (10) and the tubular element (11). The inlet tip (12) comprises a central hole (19) and at least one lateral opening for providing communication of the central hole with the annular space (18). The outlet tip (13) comprises a central hole (21) and at least one lateral opening for receiving the water circulating through the annular space (18). The lateral opening or openings of the inlet tip are arranged so as to develop a helicoidal circulation of the water in the annular space (18) whatever the operating rate may be.

22 Claims, 6 Drawing Sheets

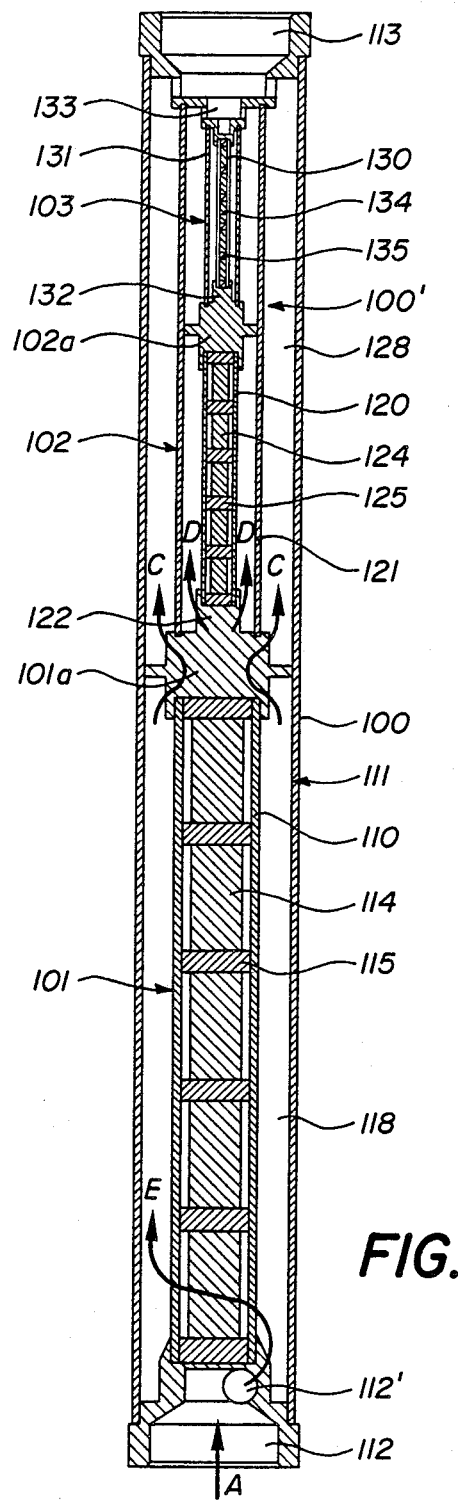
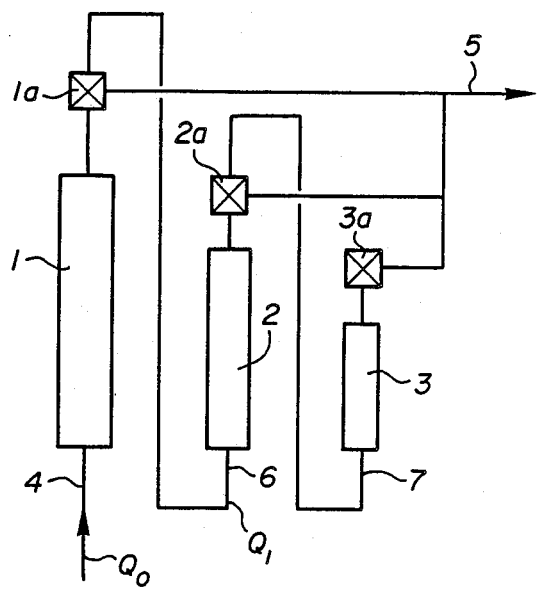
FIG. 7
FIG. 8

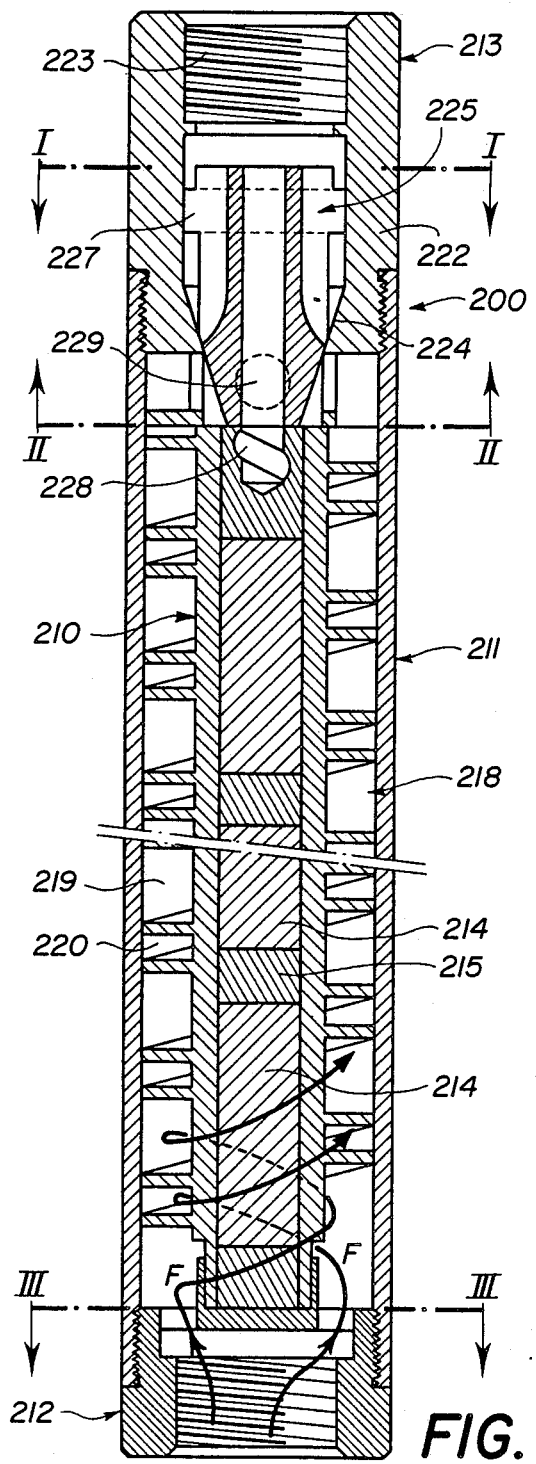
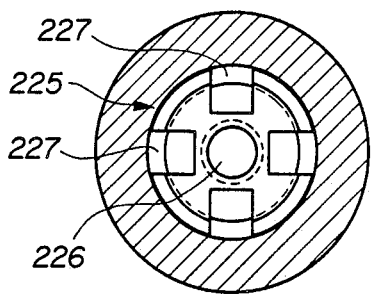
FIG. 11A
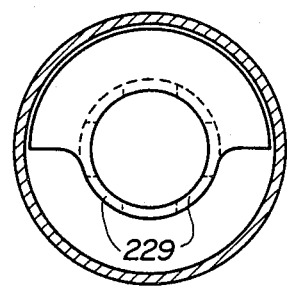
FIG. 11B
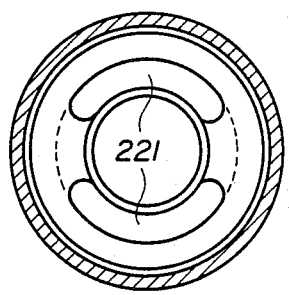
FIG. 11C
FIG. 11

DEVICE FOR CONDITIONING WATER CONTAINING CALCIUM CARBONATE AND INSTALLATION CONSTRUCTED WITH THIS DEVICE

The present invention relates to a device for conditioning water containing calcium carbonate, this treatment consisting in making the water circulate along a helicoidal path through a magnetic field created by a column of permanent magnets, separated from each other by intercalated blocks and superposed in such a manner that their adjacent poles are of the same kind, these magnets being accomodated within a first tubular element, of electrically insulating material, this device comprising a second tubular element coaxial with the first, arranged so as to provide an annular space between the first and the second tubular element.

The present invention also relates to an installation constructed by means of various combinations of several of these devices.

Various devices of this type are already known which all have the object of effecting water treatment whereby to avoid a calcareous deposit on the inner wall surfaces of pipes and tanks or on electric resistance elements of hot water generators.

One of these devices is described in the European patent application published under No. 119 368. A column of permanent magnets separated by blocks of soft iron, is surrounded by a jacket of insulating material placed within a metallic tubular element. An inlet chamber is provided with two tangential openings to permit the flow of water through the annular space situated between the jacket and the tubular element.

One of the conditions to be met for the device to operate efficiently, is for the water to circulate around the column of permanent magnets while following a helicoidal path with a small pitch, in order to allow the magnets to act (Lorentz forces) on the ions in solution, and to concentrate them in the toric zones corresponding to their charges.

The calcium carbonate colloids, of positive charge, will be covered with negative ions in the ad hoc zones, and their electrostatic repulsion will be weakened to the point that they will be able to agglomerate, and form cristallization nuclei in the fluid stream, without being deposited on the conduit walls.

Certain known systems have resorted to artifices of the baffle type to produce helicoidal flow. One of these systems is described in U.S. Pat. No. 3,923,660. Several columns of magnets are surrounded by a helicoidal guide member disposed in the annular space surrounding the columns of magnets, in order to force the water passing through for conditioning to follow a helicoidal path.

A drawback of the known systems is their complicated design so that the assembly costs are relatively high.

Another drawback of the systems which comprise no helicoidal guide member is that the flow path greatly depends on the flow rate. The flow characteristics are not the same at a low rate and a high operating range.

Now, the efficiency of the prior art systems is narrowly linked to their operating range, that is to say, to the flow rate of water circulating in the conduits which is, of course, extremely variable in domestic installations. Consequently, the efficiency of known systems is often aleatory.

It is moreover known that an impurity fixed to a wall consisting of metallic iron in contact with water constitutes an anodic zone which dissolves the metal and makes place for iron hydroxide ll $Fe(OH)_2$ in presence of aerated water, and also for iron hydroxide lll $Fe(OH)_3$ in presence of aerated water. Under certain conditions, $Fe(OH)_2$ may be converted to $Fe_3O_4$, or magnetite, which constitutes an oxide forming a very resistant layer.

By preventing the inscrustation of $CaCo_3$ on the metal, one prevents corrosion from being established because the inner surface of the piping remains clean. Consequently, the magnetic conditioner acts indirectly on corrosion.

The corrosion zones and the zones of passivation or immunity of iron in water are also known from the Pourbaix diagram, described by G. Poirier in the "Précis de protection cathodique S.T.E.C.P.A." (Paris, 1962), in pages 30 to 33.

It is known to be of particular interest to be under passivation conditions, that is to say in the zone of formation of the protective oxides ($Fe_2O_3$), if one wishes to protect the conduits from rust.

It is proposed in the present invention to meet these drawbacks by making a device having an efficiency which remains substantially constant, independent of the water flow rate in the piping of domestic or industrial installations, and which permits to bring together the conditions required for being placed in a passivating zone.

To this end, the device according to the invention, as mentioned in the preamble, further comprises two tips respectively mounted at the two extremities of the two tubular elements, arranged so as to simultaneously maintain these two tubular elements in their respective positions, these tips each comprising a central hole and at least one lateral opening causing the central hole to be in communication with the annular space.

According to a preferred embodiment, the inlet tip comprises two lateral openings which open substantially tangentially into the central hole. The projections onto a plane perpendicular to the axis of the device, of the axes of the two lateral openings of the inlet tip preferably form between them an angle lying between 60° and 80°. The axis of one of the lateral openings of the inlet tip advantateously forms an angle at least about equal to 90° with respect to the axis of the device, while the axis of the other opening preferably forms an angle less than 90° with the axis of the device. In this manner, when the device is mounted vertically, one of the openings of the inlet tip delivers a substantially horizontal jet while the other opening delivers a jet which is slightly inclined with respect to the horizontal plane, in order to produce a helicoidal path with a relatively small pitch.

To this end, the lateral openings of the inlet tip are oriented in such a manner that the helicoidal path of the water in said annular space forms with the axis of the device an angle preferably lying between 5° and 35°. This angle is advantageously at least about equal to 15°.

The height of the intercalated blocks is advantageously less than or equal to the height of the permanent magnets. In practice, the minimum height is preferably equal to 0.1 mm.

The diameter of these blocks is preferably equal to or slightly greater than that of the permanent magnets.

In order to combine the required conditions to be placed in a passivation zone, the lateral walls of the annular space provided between the first and the second tubular elements are advantageously insulated with dielectric materials.

According to a particular embodiment, the second tubular element consists of a tube section made of a dielectic material.

According to a preferred embodiment, the second tubular element consists of a metallic tube section covered on its inner side with a sheath made of a dielectric material.

The dielectric material utilized is advantageously polypropylene or polytetrafluorethylene.

Experiments carried out with different conditions such as defined above, but having different dimensions, have shown that each of these conditions provides an optimum operating range with regard to obtaining passivating conditions for the piping disposed downstream. It has been found in particular that the water circulating speed in the annular compartment defined by said first and second tubular elements is decisive for attaining passivating conditions. Now, in domestic installations, as moreover in some industrial installations, the flow rate, and consequently the speed of circulation in the conditioners, varies according to the needs of the utilizer.

In order to attain at each instant passivating conditions for the piping disposed downstream, whatever the momentary flow rate of the water in the piping may be, one may construct a composite installation which may comprise at least two of the previous conditioning devices mounted in series, or combined in a single apparatus, and at least one control valve arranged to direct the water through either of these devices depending on the water flow rate.

According to a preferred embodiment, the two water conditioning devices are mounted in extension of each other, within the same tubular compartment, and said valve is disposed between these two devices.

Each of the conditioning devices comprises a first tubular element and a second tubular element. The second tubular element of the first device is advantageously formed by said outer compartment of the installation and the second tubular element of the second device is preferably mounted coaxially within this compartment, so as to define therewith a second annular space with a section substantially equal to that of the annular space provided between the two tubular elements of the first device.

The valve arranged between two successive elements mounted in extension of each other, preferably comprises a central element movable axially within a fixed part solid with the inlet tip of the next device, and spring means arranged to push the central element into a first position when the water flow rate through the preceding element is less than a given threshold value and to be compressed and permit displacement of the central element into a second position when the water flow rate through the preceding element is superior to said given threshold value.

According to a particular embodiment, the spring means comprise a spiral spring.

According to an advantageous embodiment, the spring means comprises a pneumatic system consisting of a hermetic annular chamber provided between the movable element and the fixed part, this chamber being arranged to receive a gas under pressure.

The installation may advantageously comprise several, and in particular three devices mounted in series, disposed in extension of each other, coaxially within the outer compartment, each of these devices being designed so that the water flow rate which effectively passes through it and the circulating rate in the annular spaces which surround it have a sum substantially equal to the flow rate measured at the inlet of the first device having the greatest capacity.

According to one embodiment, the installation comprises two integrated water conditioning devices and the annular space provided between a first, inner tubular element and a second, outer tubular comprises two helicoidal channels of different sections, the outlet tip comprising a movable member arranged to be displaceable between a closing position, in which the helicoidal channel having the greater section is closed off, and an opening position, in which none of said channels is closed off.

According to another embodiment, said helicoidal channels are provided in the wall thickness of the inner tubular elements.

According to an advantageous embodiment, the installation comprises two integrated water conditioning devices and an intermediate tubular element disposed between an inner tubular element and an outer tubular element, this intermediate tubular element defining with the two other tubular elements two annular spaces and the outlet tip comprises a movable member arranged so as to be displaceable between a closing position wherein the outer annular space is closed off, and an opening position wherein none of said spaces is closed off.

According to a particular embodiment, the outlet tip advantageously comprises a conical seat and the movable member consists of a shutter equipped with a conical tip adapted to said seat, with a central channel provided with lateral openings and with at least one axial groove disposed at its periphery.

The present invention and its main characteristic features will be better understood with reference to the description of examples of embodiments and the accompanying drawings, wherein.

FIG. 7 schematically represents a first embodiment of an installation constructed by means of the devices according to the FIGS. 1 to 6.

FIG. 8 represents the preferred mode of embodiment of such an installation.

Figure 9:
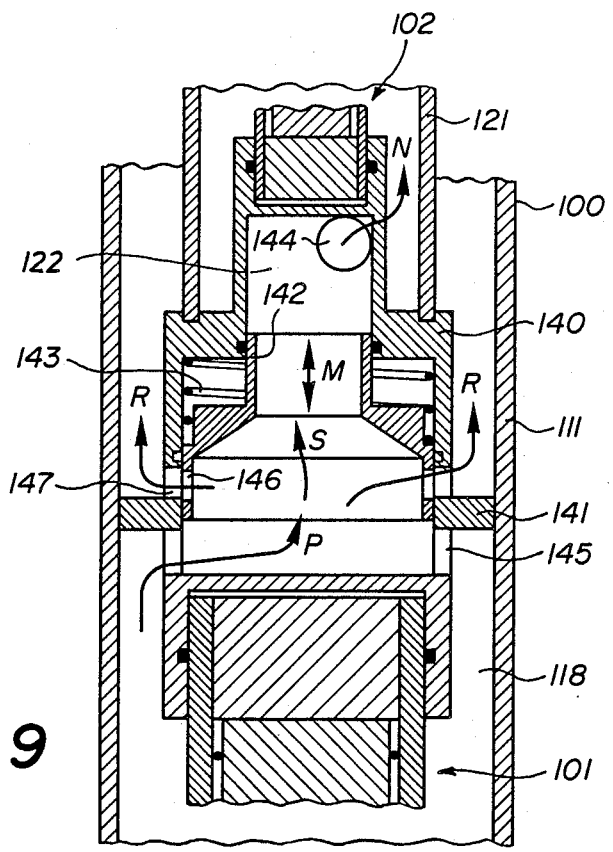

FIG. 9 represents an enlarged detailed view of a control valve mounted between two adjacent conditioners of the installation.

Figure 10:
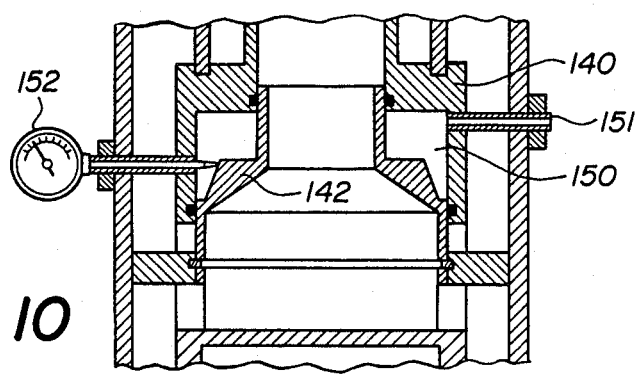

FIG. 10 represents a detailed view of a variant of the embodiment of the valve according to FIG. 9.

FIG. 11 represents an axial sectional view of another embodiment of the installation according to the invention.

Figure 12:
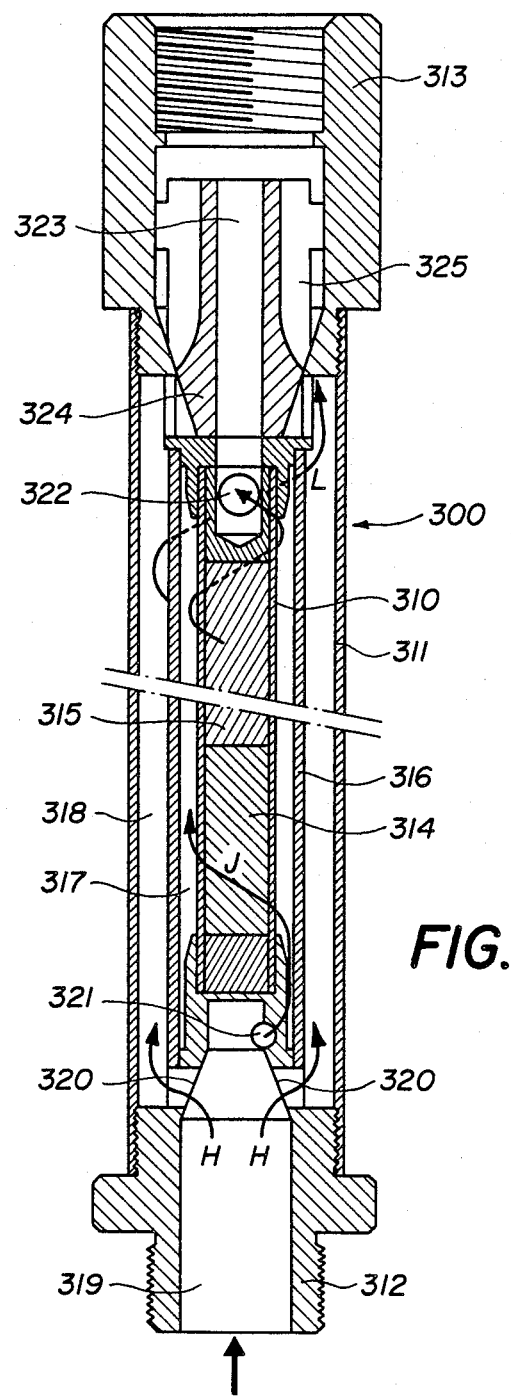

FIGS. 11A, 11B and 11C respectively represent three cross-sectional views of the device illustrated in FIG. 11, and FIG. 12 represents an axial sectional view of another embodiment of the installation according to the invention.

Figure 1:
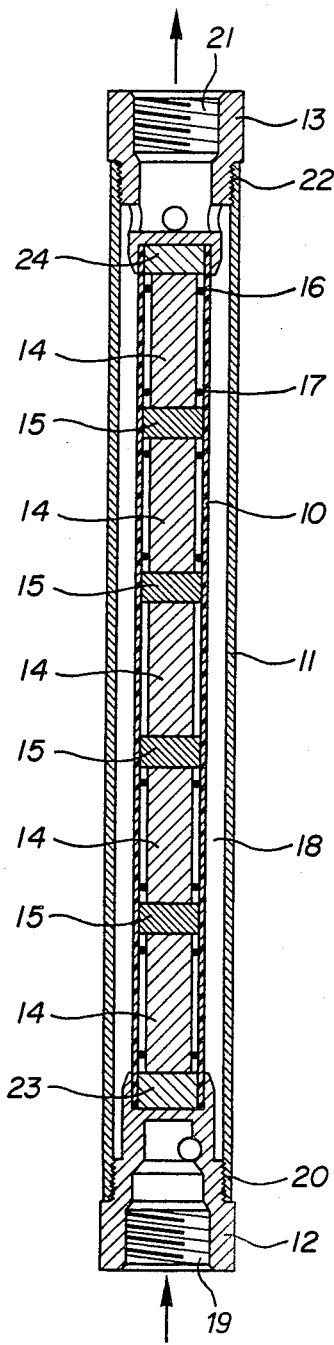
FIG. 1 represents a longitudinal sectional view of a first embodiment of the device according to the invention.

With reference to FIG. 1, the illustrated device essentially comprises a first, inner tubular element 10, a second, outer tubular element 11 mounted coaxially with respect to the inner tubular element 10, an inlet tip 12 and an outlet tip 13. The inner tubular element 10 consists of a cylindrical tube section preferably made of synthetic material, containing a series of superposed permanent magnets 14, of cylindrical form for example, separated by intercalated blocks 15, of soft iron for example, and laterally retained within the tube by two O-ring seals 16 and 17. It will be noted that the inner tubular element 10 presents a perfectly smooth outer wall surface, free of any projections or baffles capable of developing uncontrolled turbulence.

The outer tubular element 11 has a diameter greater than that of the inner tubular element 10 and is disposed around the latter so that an annular space 18 is provided between the external wall surface of the inner tubular element 10 and the internal wall surface of the outer tubular element 11. The internal wall surface of the outer tubular element 11 is also smooth and has neither projections nor baffles, for the same reasons as mentioned above.

The inlet tip 12 and the outlet tip 13 have in this case a generally identical form. The inlet tip comprises a central hole 19 and a first neck 20, the external wall of which is threaded to permit fixation of the outer tubular element 11 whose end section presents an inner threaded zone. In a similar way, the outlet tip 13 also comprises a central hole 21 and a zone of narrowed section 22, threaded to permit fixation by screwing of the other extremity of the outer tubular element 11. The inlet tip 12 comprises at its extremity directed towards the interior of the device a circular groove 23 for mounting the extremity of the inner tubular element 10. The outlet tip 13 similarly comprises at its extremity directed to the interior of the device an annular groove 24 designed to receive the other extremity of the inner tubular element 10. When the two inlet and outlet tip are screwed onto the outer tubular element, the inner tubular element is maintained in position, by means of said grooves 23 and 24.

Figure 2:
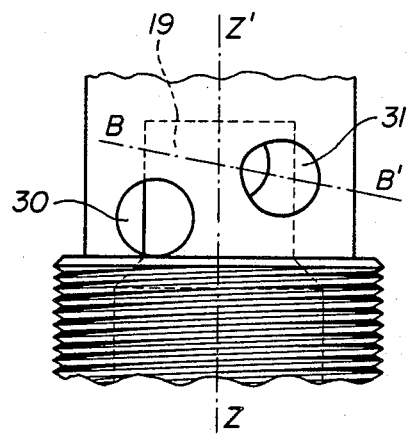
FIG. 2 represents a partial elevation view of the inlet tip of the device according to the invention.
Figure 3:
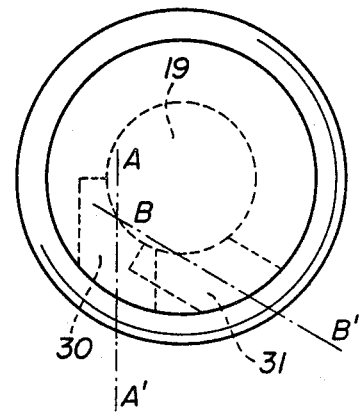
FIG. 3 represents a view from the bottom of the inlet tip of FIG. 2.

The inlet tip illustrated in FIGS. 2 and 3 comprises two lateral openings 30 and 31 for providing communication of the central hole 19 with the annular space 18. These two openings which open substantially tangentially into the central hole 19 are angularly offset in projection on the same horizontal plane and in height, the device being mounted vertically. The axis AA' forms with the axis ZZ' of the device an angle substantially equal to 90°. On the other hand, the axis BB' forms with the axis ZZ' of the device an angle less than 90°. This design permits, as previously mentioned, a spiral circulation of small pitch to be developed around the column of magnets.

Figure 4:
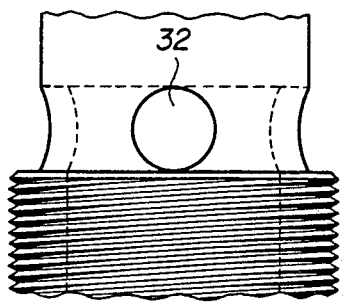
FIG. 4 represents a partial elevation view of the outlet tip of the device of FIG. 1.
Figure 5:
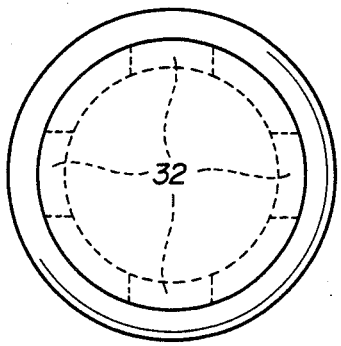
FIG. 5 represents a view from the top of the outlet tip shown in FIG. 4.

The outlet tip illustrated in FIGS. 4 and 5 advantageously comprises three or four openings 32 regularly distributed around the periphery of a section of reduced diameter. This distribution allows rapid and efficient discharge of the water having passed through the device.

Figure 6:
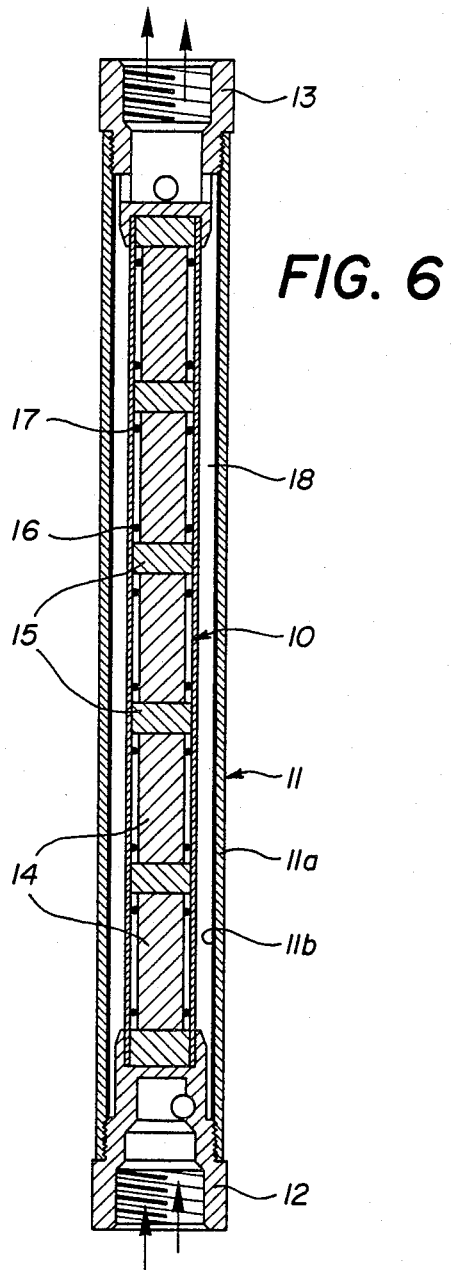
FIG. 6 represents a longitudinal sectional view of a second embodiment of the device according to the invention.

To facilitate the comprehension of FIG. 6, the various elements of the illustrated device will be designated with the same references, corresponding to identical elements of the device illustrated in FIG. 1.

The water treatment device represented in this figure essentially comprises a first, inner tubular element 10, a second, outer tubular element 11, mounted coaxially with respect to the inner tubular element 10, an inlet tip 12 and an outlet tip 13. The inner tubular element 10 consists of a cylindrical tube section containing a series of superposed permanent magnets 14, separated by intercalated blocks 15 and laterally retained within the tube by two O-ring seals 16 and 17.

The outer tubular element 11 has a diameter greater than that of the inner tubular element 10 and is disposed around the latter so that an annular space 18 is provided between the external wall surface of the inner tubular element 10 and the internal wall surface of the outer tubular element 11. The inlet and outlet tips 12 and 13 are identical with those of the device represented in FIG. 1.

The first, inner tubular element 10 is made of a dielectric material such as polypropylene or polytetrafluorethylene or of any other similar dielectric material. The outer tubular element 11 advantageously consists of an outer metallic tube section 11a made of stainless steel for example, and an inner sheath 11b made of a dielectric material such as for example polypropylene or polytetrafluorethylene or of any other similar dielectric material. Making the outer tube 11a of stainless steel for example allows to ensure shielding against external magnetic influences and consequently to protect the permanent magnets 14 of the inner column. In certain embodiments one might envisage an outer tubular element 11 made entirely of dielectric material.

Various tests have allowed to determine that if water is treated with a device of this type, i.e. a magnetic conditioner whose treatment chamber is insulated with dielectrics in such a manner that the water and its components, that is to say the colloids and ions which it carries, is not in contact with a metal when it undegoes the influence of magnectic fields, one obtains passivating conditions for the piping disposed downstream. The direct consequences thereof are a good protection of this piping against corrosion, which protection, according to the tests, is prolonged during several days after termination of any water circulation in the piping.

FIG. 7 illustrates a particular embodiment of the installation according to the invention, comprising any number, for example three devices 1, 2 and 3 for the treatment of water containing calcium carbonate, identical with those represented in FIGS. 1 and 6. With each of theses devices, a valve 1a, 2a and 3a is respectively associated, which may be manually actuated or automatically controlled according to any principle known per se, as a function of the flow rate Qo of the water which circulates in the inlet conduit 4. This flow rate may for example be measured, and the installation may be equipped with a central unit arranged to control the valve 1a as a function of this flow rate.

Each of the three devices 1, 2 and 3 is dimensioned to operate optimally in a fixed flow rate range. For example, the device or conditioner 1 is designed to operate optimally with flow rates higher than 30 l/min, the device 2 is designed to operate optimally with flow rates lying between 15 and 30 l/min, and the device 3 is designed to operate with flow rates below 15 l/min.

The valves 1a, 2a and 3a are valves with one inlet and two outlets. When the inlet flow rate Qo is above 30 l/min, the water treated by the conditioner 1 is immediately directed by the valve 1a to the outlet conduit 5.

On the other hand, when the inlet flow rate Qo is below 30 l/min, the valve 1a selects the other outlet passage and directs the pretreated water to the inlet 6 of the second conditioner 2.

If the flow rate Q1 determined at this point is situated in the range of optimal operation of the second conditioner, that is to say it lies between 15 and 30 l/min, the water is immediately directed by the valve 2a to the outlet 5 of the installation.

If the flow rate Q1 is below 15 l/min, the valve 2a directs the water towards the inlet 7 of the third conditioner 3, where it is treated before being transmitted to the outlet 5 of the installation.

It is evident that such a conditioning in successive treatment stages could be generalized. The installation could comprise a greater number of conditioners each operating in an optimal manner in a well defined range of flow rates.

FIG. 8 illustrates a particularly advantageous embodiment of another installation with three water treatment stages. This installation comprises an outer compartment 100 containing the three treatment devices 101, 102 and 103 and two control valves 101a and 102a. The three devices are superposed and coaxial.

The conditioning device 101 comprises a first, inner tubular element 110 containing a column of magnets 114 separated by intercalated blocks 115 of soft iron for example, and a second outer tubular element 111, which consists in this case of the walls of the outer compartment 100. The inlet tip 112 is identical with the inlet tip 12 of the device represented in FIG. 1. The outlet tip is incorporated in the valve 101a which will be described subsequently in more detail with reference to FIGS. 9 and 10.

The conditioning device 102 comprises as before a first, inner tubular element 120, containing a column of magnets 124, separated by intercalated blocks 125, for example of soft iron, and a second outer tubular element 121, which is formed in this case by the walls of an inner compartment 100'. The inlet tip 122 is incorporated in the valve 101a and the outlet tip is incorporated in the valve 102a.

The conditioning device 103 likewise comprises a first, inner tubular element 130 containing a column of magnets 134 separated by intercalated blocks 135, for example of soft iron, and a second, outer tubular element 131. The inlet tip 132 is incorporated in the valve 102a and the outlet tip 133 is incorporated in the general outlet tip 113 of the installation. This outlet tip is identical with the outlet tip 13 illustrated in FIG. 1.

The device operates in practice in the same manner as the device illustrated in FIG. 7. Thus, the water which enters via the tip 112 in the direction of the arrow A, passes through the orifices 112' provided in this tip and enters in the form of a helicoidal stream illustrated by the arrow E within the annular compartment 118. If the initial flow is sufficiently high for the circulating speed of the water to correspond to optimal operation of the device 101, and the valve 101a remains open and allows the water to circulate through the second annular space 128, provided between the outer compartment 100 and the inner compartment 100', in the direction of the arrows C and to pass through the second device 102 in the direction of the arrows D.

On the other hand, if the flow rate is below the optimum operating threshold of the device 101, for example at 30 l/min, the valve 101 is closed and prevents the discharge of pretreated water by the device 101 through the annular space 128. The water is in this case forced to pass through the conditioner 102 in the direction of the arrows D. The valve 102a acts in the same manner between the conditions 102 and 103.

FIG. 9 illustrates a particularly advantageous embodiment of the valve 101a (or the valve 102a). This valve consists essentially of a fixed element 140 made solid with the outer tubular element 111 by a connecting ring 141 and an element 142 mounted within the fixed prat 140 and movable axially according to the double arrow M. A spring 143 is mounted between the part 140 and the movable element 142. The fixed part 140 comprises the inlet tip 122 of the second conditioner stage, that is to say of the device 102. This tip 122 comprises at least one lateral orifice 144 which allows the flow of water in the direction of the arrow N, in the form of a helicoidal stream within the corresponding annular space. This fixed part 140 also comprises the outlet tip of the conditioner 101 provided with the lateral openings 145 allowing the flow of water coming from the annular space 118, in the direction of the arrow E.

In the disposition represented in FIG. 9, the pressure exerted by water circulating in the direction of the arrow E is sufficiently high to compress the spring 143. The movable element 143 is thereby repelled upwards, which results in bringing the radial openings 146 of the movable element 142 opposite the lateral openings 147 provided in the fixed part 140. A portion of the stream illustrated by the arrow P may thereby be discharged in the direction of the arrows R through the openings 146 and 147 into the annular chamber defined by the inner wall surface of the outer compartment 100 and the outer wall surface of the second tubular element 121 of the conditioner 102. Another portion of the stream illustrated by the arrow P may be discharged in the direction of the arrow S to the interior of the second conditioner 102.

The illustrated example corresponds to an initial flow rate higher than the previously mentioned threshold, which is for example 30 l/min. The pressure of the spring is calculated in such a manner that the valve opens, since the water has already been treated by the conditioner 101. If the initial flow rate falls below this threshold, the pressure exerted by the spring 143 lowers the movable element 142, which consequently closes the valve and forces the stream illustrated by the arrow P to circulate in the direction of the arrow S, the openings 147 being closed off and preventing the passage of water in the direction of the arrows R.

The valve illustrated in FIG. 10 is of the pneumatic type. The chamber 150 provided between the fixed part 140 and the movable element 142 is supplied through a conduit 151 with gas under pressure, the pressure of which is controlled by a measuring instrument, for example a manometer 152. This chamber with adjustable pressure meets the same function as the spring 143 illustrated in FIG. 9. The advantage of the pneumatic system is to allow greater flexibility due to the fact that the pressure may be very simply adjusted and its value may be controlled by direct reading.

The embodiment illustrated in FIG. 11 and the cross-sectional views along the lines 1—1, and 11—11 and 111—111 corresponding respectively to FIGS. 11a, 11B and 11C, allow conditioning to be effectively ensured for two complementary ranges of flow rates. The conditioner 200 comprises a first, inner tubular element 210, a second, outer tubular element 211 mounted coaxially with respect to the inner tubular element 210, an inlet tip 212 and an outlet tip 213. As opposed to the embodiments represented in FIGS. 1 and 6, this conditioner comprises an outlet tip 213 which differs from the inlet tip 212. The inner tubular element 210 contains a series of superposed permanent magnets 214, of cylindrical form for example, separated by intercalated blocks 215 made of soft iron for example.

The annular space 218 provided between the inner wall surface of the outer tubular element 211 and the outer wall surface of the inner tubular element 210, is filled out by a double helicoidal channel composed of a channel 219 called hereinafter "of large section" and a channel 220 hereinafter called "of small section". In practice, the inner tubular element 210 will have the form of a double screw with a hollow axis, molded in one piece or machined, which is accomodated within the outer tubular element 211. The two channels 219 and 220 are connected via openings 221 which are visible especially in FIG. 11c, to the central hole of the inlet tip 212, thereby allowing the water to be conditioned to enter into said channels in the direction of the arrows F.

The outlet tip consists of a cylindrical part 222 provided with a central hole 223 whose lower part is in the form of a conical seat 224. A movable shutter 225 represented in a plan view in FIG. 11A is accomodated within this hole. This shutter is provided with a central channel 226 and comprises a conical lower end section which is adapted to the conical seat 224. Four axial grooves 227 are provided at the periphery of the movable shutter 225. A lateral opening 228 allows communication to be ensured between the channel of small section 220 and the central channel 226 of the movable shutter 225.

When the flow rate of the water to be conditioned is below a limiting threshold determined by the manufacturer as a function in particular of the weight of the movable shutter 225, said shutter stays supported on the conical seat 224. This results in closing off the channel of large section 219.

When the flow rate of the water to be conditioned is greater then this limiting threshold, the movable shutter 225 is raised by the pressure exerted by the water which may then pass via the lateral grooves 227 and through openings 229 (see FIG. 11B) permitting flow in the central channel 226 in the direction of the central hole 223.

Whatever the flow rate of the water to be conditioned may be, the path remains helicoidal around the column of magnets. The inner tubular element is made of a dielectric material. The inner wall surface of the outer tubular element is covered with a layer of dielectric material.

The conditioner 300 illustrated in FIG. 12 comprises as before a first, inner tubular element 310, a second tubular element 311, mounted coaxially within the first tubular element, an inlet tip 312 and an outlet tip 313.

The inner tubular element 310 contains a series of superposed permanent magnets 314, separated by intercalated blocks 315. Between the two tubular elements 310 and 311, a third, intermediate tubular element 316 is disposed, which defines with the two other elements two annular spaces 317 and 318 for passage of the water to be conditioned.

The inlet tip 312 comprises a central hole 319 and one or several openings 320 which permit the flow of water in the annular space 318, in the direction of the arrows H, and one or several lateral openings 321 which permit the flow of water in the annular space 317, in the direction of the arrow J.

The outlet tip 313 is substantially identical with the outlet tip 213 of the conditioner in FIG. 11. In the case of a low flow rate, it closes off the outer annular space 318 and the water conditioned when passing through the annular space 317 flows via lateral openings 322, into the central channel 323 of the movable shutter 324 in the direction of the arrow K. In the case of a high flow rate, the movable shutter 324 is raised, under the effect of pressure, and the water may flow in the direction of the arrow L, via the lateral grooves 325 of the movable shutter.

Consequently, whatever the flow rate may be, the water circulates along a helicoidal path around the column of magnets. The only mobile part is the movable shutter which may be supported upon its conical seat or be raised more or less depending on the pressure exerted by the water. In order to obtain improved security of operation, this movable shutter may be equipped with an adjustable return system of the spring type or the like. The system is perfectly reliable and does not comprise any delicate part.

The present invention is not limited to the described embodiments while it may undergo different modifications and may have multiple variants obvious to a person skilled in the art. One may in particular conceive that the two cylindrical channels of so-called "large section" and "small section" be replaced with channels having a form such as for example consisting of helixes, coiled and superposed tubes, parts which are molded, injected or the like, or with double, triple or multiple channels. The movable shutter may likewise have any other form than of conical or cylindrical type. The axial grooves, provided at its periphery, are four in number in the illustrated examples. However, their number and their arrangment may be different according to the desired discharge flow rate.

I claim:

1. Device for conditioning water containing calcium carbonate by circulating the water along a helicoidal path across a permanent magnetic field, comprising:
   a first tubular element made of electrically insulating material, an axial stack of permanent magnets in the first tubular element, the magnets being arranged with like poles of adjacent magnets adjacent each other; intercalated blocks in the first tubular element and placed for separating the magnets;
   a second tubular element arranged coaxially around the first tubular element to define an annular space for circulation of water between the first and the second tubular elements; and
   inlet and outlet tip elements mounted respectively at both ends of the tubular elements for closing the first tubular element and for holding both tubular elements in their respective relationship, each tip element having an axial bore and having at least one lateral opening providing communication between the axial bore of the tip element and the annular space between the tubular elements;
   the at least one lateral opening of the inlet tip element comprising a first lateral opening which is directed substantially tangentially with respect to the axial bore and which has a first axis forming an angle of about 90° with the axial direction of the device, and a second lateral opening which is also directed substantially tangentially with respect to the axial bore but which has a second axis that is inclined to form an angle smaller than 90° with the axial direction of the device, wherein respective projections of the first and second axes in a plane perpendicular to the axial direction of the device form with each other an angle in the range from 60° to 80°, and whereby the angles of the first and the second lateral openings generate a helicoidal path of water flowing in the annular space.

2. Device according to claim 1, wherein the first and second tubular elements have respective opposite, spaced apart, coaxial, cylindrical, smooth surfaces which define the annular space between the surfaces, and the smooth surfaces and the annular space being free from any projections or baffles.

3. Device according to claim 1, wherein the first and the second lateral openings of the inlet tip are oriented in such a manner that the helicoidal path of water in the annular space forms with the axial direction of the device an angle lying between 5° and 35°.

4. Device according to claim 1, wherein the lateral openings of the inlet tip are oriented in such a manner that the helicoidal path of water in the annular space forms with the axial direction of the device an angle of about 15°.

5. Device according to claim 1, wherein the axial length of the intercalated blocks is at most equal to the axial length of the permanent magnets.

6. Device according to claim 1, wherein the diameter of the intercalated blocks is at least equal to the diameter of the permanent magnets.

7. Device according to claim 1, wherein the lateral walls of the annular space provided between the first and the second tubular element are insulated by a dielectric material with respect to the annular space.

8. Device according to claim 7, wherein the second tubular element comprises a tube section made of a dielectric material.

9. Device according to claim 7, wherein the second tubular element comprises a metallic tube section having an internal covering sheath made of a dielectric material.

10. Device according to claim 7, wherein the dielectric material is polypropylene.

11. Device according to claim 7, wherein the dielectric material is polytetrafluorethylene.

12. Water conditioning installation comprising at least two of the water conditioning devices according to claim 1, each device having a respective different outer diameter, wherein the two devices comprise a larger diameter first device and a smaller diameter second device; the devices being arranged in series and in axial alignment with each other;
the two devices having a common tubular jacket around them, the second tubular element of the smaller diameter device being surrounded by the tubular jacket for defining an annular discharge duct around the smaller diameter device and inside the tubular jacket; and
a control valve between the two devices, the control valve being connected to the larger diameter device, to the smaller diameter device and to the discharge duct for controlling water flow through the discharge duct.

13. Installation according to claim 12, wherein the second tubular element of the second device is mounted coaxially within the tubular jacket so as to define therewith a second annular space of substantially equal section to that of the annular space provided between the first and second tubular elements of the first device.

14. Installation according to claim 12, wherein the valve between the two devices comprises a valve seat and a central element movable axially within the valve seat, the valve seat being part of and a continuation of the inlet tip element of the device that follows the valve; and spring means arranged to push the central element into a first position when the water flow rate through the device that precedes the valve is below a predetermined threshold value, and the spring means to be compressed and permit displacement of the central element into a second position when the water flow rate through the device preceding the valve is greater than the predetermined threshold value.

15. Installation according to claim 14, wherein the spring means comprise a spiral spring.

16. Installation according to claim 14, wherein the spring means comprise a pneumatic system comprising a hermetic annular chamber between the movable central element and the valve seat, the chamber being capable of containing a gas under pressure.

17. Installation according to claim 12, wherein the devices are mounted in series in extension of each other and are disposed coaxially within the tubular jacket, each device being designed so that the flow rate of the water passing through it and the flow rate of the water circulating in the annular spaces surrounding it have a sum substantially equal to the flow rate at the inlet of the first of the devices.

18. Installation for conditioning water containing calcium carbonate by circulating the water along a helicoidal path across a permanent magnetic field, comprising:
a first tubular element made of electrically insulating material, an axial stack of permanent magnets in the first tubular element, the magnets being arranged with like poles of adjacent magnets adjacent each other; intercalated blocks in the first tubular element and placed for separating the magnets;
a second tubular element arranged coaxially around the first tubular element to define an annular space for circulation of water between the first and the second tubular elements;
an inlet and an outlet tip mounted respectively at both ends of the tubular elements for closing the first tubular elements and for holding both tubular elements in their respective relationship, each tip having an axial bore and having at least one lateral opening providing communication between the axial bore and the annular space; and
two parallel helical walls defining first and second helical channels in the annular space between the inlet tip and the outlet tip, the second helical channel having a larger cross-section than the first helical channel;
wherein the outlet tip comprises a shutter which is movable by a predetermined water pressure in the annular space from a closing position wherein the outlet tip axial bore communicates with the first helical channel but not with the second one, to an opening position wherein the axial bore communicates with both helical channels.

19. Installation according to claim 18, wherein the helical walls are integral with the first tubular element.

20. Installation according to claim 19, wherein the outlet tip element comprises a conical seat and the shutter includes a conical tip adapted to the seat, the shutter including a central channel provided with lateral openings, and including at least one axial groove disposed at its periphery.

21. Device for conditioning water containing calcium carbonate by circulating the water along a helicoidal path across a permanent magnetic field, comprising:
- a first tubular element made of electrically insulating material, an axial stack of permanent magnets in the first tubular element, the magnets being arranged with like poles of adjacent magnets adjacent each other; intercalated blocks in the first tubular element and placed for separating the magnets;
- an intermediate tubular element arranged coaxially around the first tubular element to define a first annular space for circulation of water between the intermediate tubular element and the first tubular element;
- a second tubular element arranged coaxially around the intermediate tubular element to define a second annular space for circulation of water between the intermediate tubular element and the second tubular element;
- inlet and outlet tip elements mounted respectively at both ends of the tubular elements for closing the first tubular element and for holding the tubular elements in their respective relationship, each tip element having an axial bore and at least one lateral opening providing communication between the axial bore and the annular spaces;
- the at least one lateral opening comprising the inlet tip element having two pairs of lateral openings communicating respectively with the first and second annular spaces, each pair of lateral openings comprising a first lateral opening which is directed substantially tangentially with respect to the axial bore and which has a first axis forming an angle of about 90° with the axial direction of the tubular elements, and a second lateral opening which also is directed substantially tangentially with respect to the axial bore but which has a second axis forming an angle smaller than 90° with the axial direction of the tubular elements, wherein respective projections of the first and the second axes in a plane perpendicular to the axial direction form with each other an angle in the range from 60° to 80°, and whereby the angles of the first and the second lateral openings generates a helicoidal path of water flowing in the annular space; and
- the outlet tip element comprises a shutter which is movable by a predetermined water pressure in the second annular space from a closing position wherein the outlet tip element axial bore communicates with the first annular space but not with the second annular space, to an opening position wherein the axial bore communicates with both annular spaces.

22. Device according the claim 21, wherein the outlet tip element comprises a conical seat and the shutter includes a conical tip adapted to the seat, the shutter including a central channel provided with lateral openings, and including at least one axial groove disposed at its periphery.

* * * * *